Figure 1:
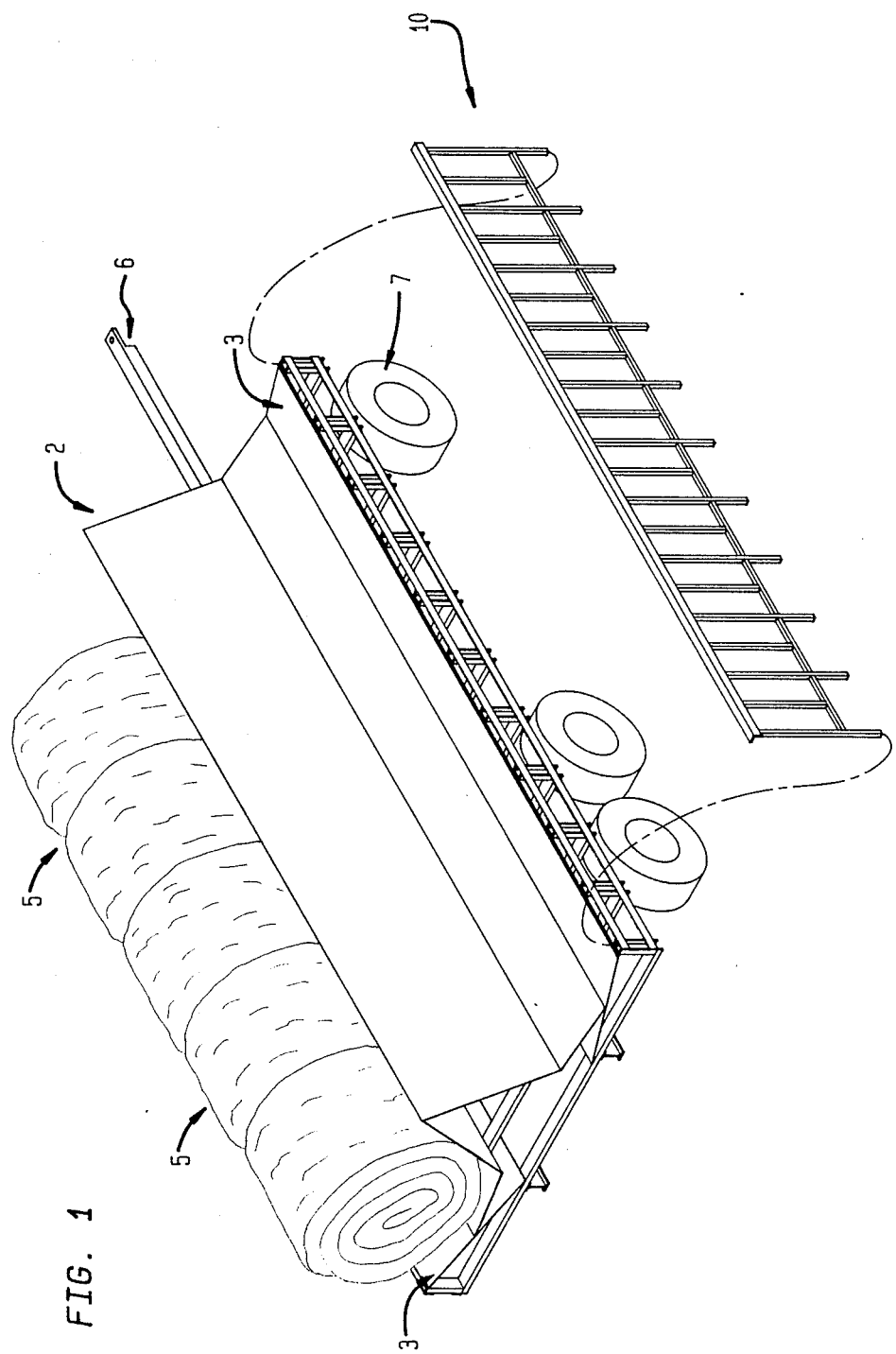

United States Patent [19]

Palmer

[11] Patent Number: 4,930,958
[45] Date of Patent: Jun. 5, 1990

[54] ROUND BALE CARRIER AND UNLOADER

[76] Inventor: Karl Palmer, R.D. #2, Box 50, Earlville, N.Y. 13332

[21] Appl. No.: 307,678

[22] Filed: Feb. 8, 1989

[51] Int. Cl.⁵ .............................................. B60P 1/00
[52] U.S. Cl. ................................... 414/24.5; 414/540; 298/13; 298/18
[58] Field of Search .................... 414/24.5, 24.6, 539, 414/540, 545, 525.1, 495, 911; 298/13, 18

[56] References Cited

U.S. PATENT DOCUMENTS

| | | | |
|---|---|---|---|
| 3,922,036 | 11/1975 | Kalsbeck et al. ..................... | 298/18 |
| 4,261,676 | 4/1981 | Balling, Sr. ......................... | 414/24.5 |
| 4,329,102 | 5/1982 | Gray .................................... | 414/24.5 |
| 4,500,242 | 2/1985 | Beikman ............................. | 414/24.5 |
| 4,537,548 | 8/1985 | Lockhart ............................ | 414/24.5 |
| 4,549,840 | 10/1985 | Ansbjer .............................. | 414/24.5 |
| 4,580,843 | 4/1986 | Lund .................................. | 414/24.5 X |

FOREIGN PATENT DOCUMENTS

| | | | |
|---|---|---|---|
| 1144524 | 4/1983 | Canada ............................. | 414/789.4 |
| 289012 | 1/1971 | U.S.S.R. ........................... | 414/539 |

Primary Examiner—Frank E. Werner
Assistant Examiner—James T. Eller, Jr.
Attorney, Agent, or Firm—Randall L. Reed

[57] ABSTRACT

A farm utility wagon for carrying round or cylindrical bales with a center superstructure running from the front to the rear of the wagon. The superstructure can be raised or lowered by hydraulic cylinders. When the superstructure is in a lowered position it forms with the wagon base two parallel channels on to which two parallel rows of round or cylindrical bales can be set and moved. When the superstructure is raised, the bales are forced off to the side.

5 Claims, 7 Drawing Sheets

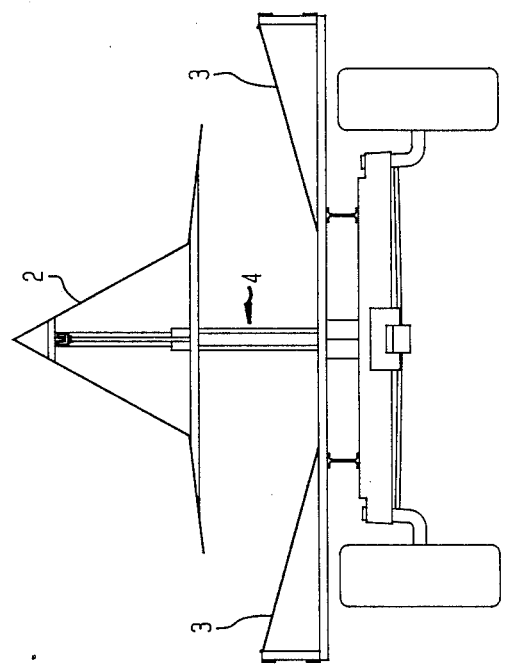
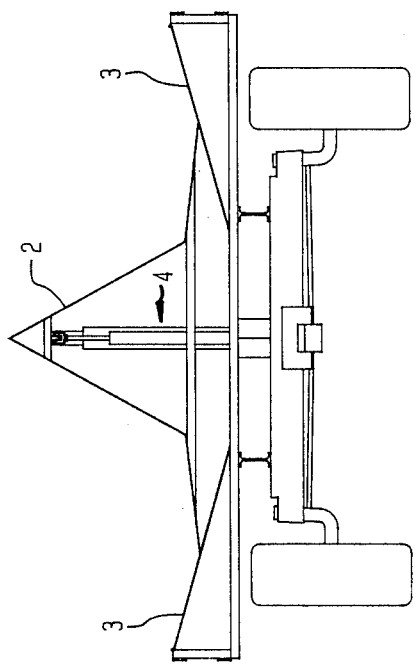

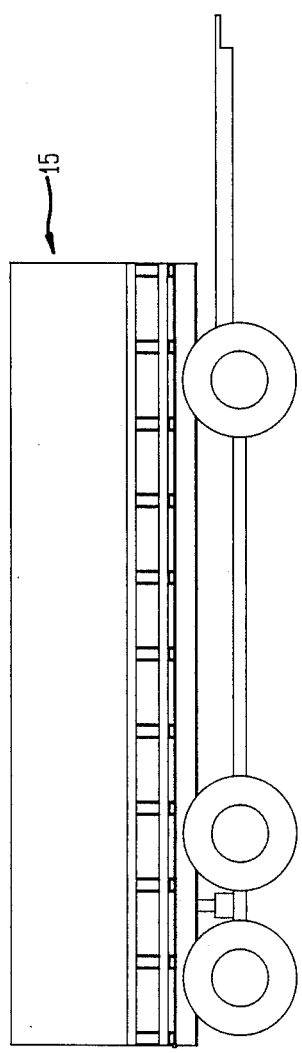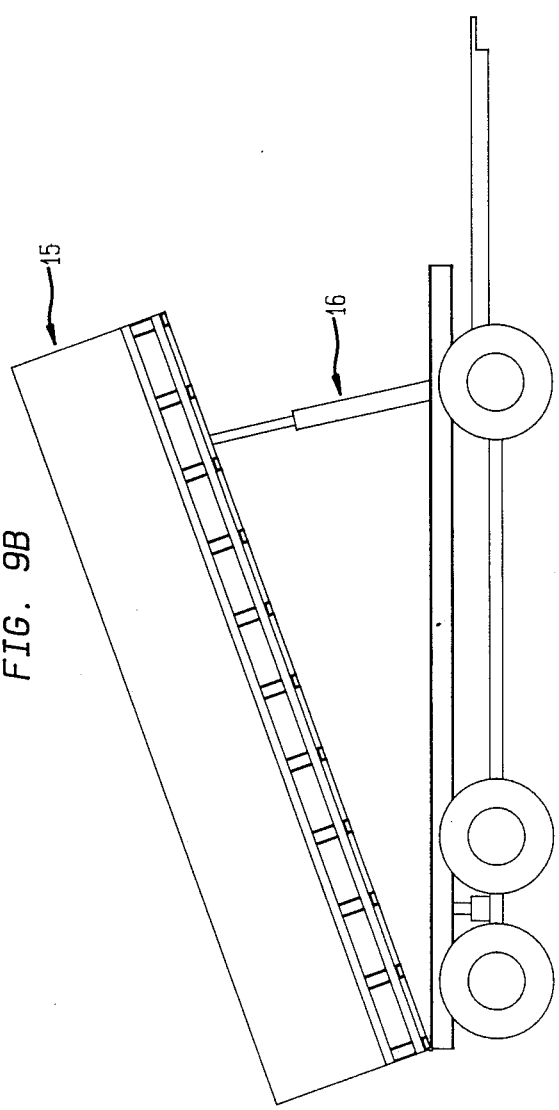

ROUND BALE CARRIER AND UNLOADER

BACKGROUND OF THE INVENTION

1. Field of Invention

The invention described in this application is a farm utility vehicle the primary function of which is to carry and unload round or cylindrical bales of hay or similar crops. The invention also has a secondary use as a fodder or feed wagon when appropriately modified.

Farming in the past several decades in the United States has remained an economical pursuit by constant elimination and reduction of the physical labor and the associated costs required to accomplish a task. The use of machines and altering practices and techniques are some of the means of reducing labor costs. The development of round or cylindrical bales within the last 10 to 15 years is one aspect of this process. Round or cylindrical bales are 4 to 6 feet in diameter and 4 to 5 feet high, weighing anywhere from 800 to 1100 pounds depending upon their density, circumference and length. Use of large round or cylindrical bales substantially reduces labor costs. The smaller rectangular or tetrahedral shaped bales in wide spread use for the last 30 to 40 years have much higher labor costs in production, transportation, and storage. One round bale can contain the same amount of hay as 15 to 25 rectangular bales. However, large round bales, because of their weight and size are extremely hard to move to an appropriate storage site for protection from the elements while awaiting use. Numerous attempts have been made to resolve this problem. The invention described herein is one successful resolution of that problem.

2. Description of Prior Art

Beikman U.S. Pat. No. 4,500,242 appears to be the closest prior art in which two rows of parallel bales are carried in semi-cylindrical frame baskets which baskets are pivoted by hydraulic means to the side to unload the bales. Ansbjer U.S. Pat. No. 4,549,840 carries a single row of cylindrical bales in a U-shaped carrier and unloads them by pushing the bales off the end. Lund U.S. Pat. No. 4,500,843 is a bale rack which carries two rows of parallel bales with a divider running down the center; the bales are unloaded to the side of the wagon by releasing a restraining rail or device which runs along the outside of each row. A good number of other devices have been patented for transportation and unloading of round bales but are substantially different.

II. SUMMARY OF THE INVENTION

The purpose of this invention is to provide a means of conveyance of large round or cylindrical bales from the place of production to an appropriate place of storage and a convenient means for unloading the bales with as little labor and investment in machinery as possible. Other uses will be obvious to those who are familiar with the art.

The basic invention consists of a wagon frame with one or more axles and wheels to provide mobility. A superstructure is mounted on the frame and runs down the center of the wagon from the front to the rear. The superstructure can be raised above or lowered onto the frame by hydraulic or other means. The superstructure, when lowered onto the frame, forms on either side with the topside portions of the frame, two channels along which two rows of round bales can be aligned parallel to the superstructure.

The wagon frame with axles can then be moved by a tractor or other means of mobility to a suitable place for storage of the round bales. To unload the bales the center superstructure is raised by hydraulic or other means and the bales are forced off to the side. The hydraulic means is generally powered by the tractor.

The invention can be modified by the addition to the sides of the wagon of ladder like devices which act as stanchions and allow the device to be used as a mobile feed wagon.

III. DESCRIPTION OF THE DRAWING

The following drawings more clearly illustrate the invention.

1. FIG. 1 an elevated view from the right rear portion of the wagon with one of the channels filled with a row of round bales and the other empty.

Figure 2:
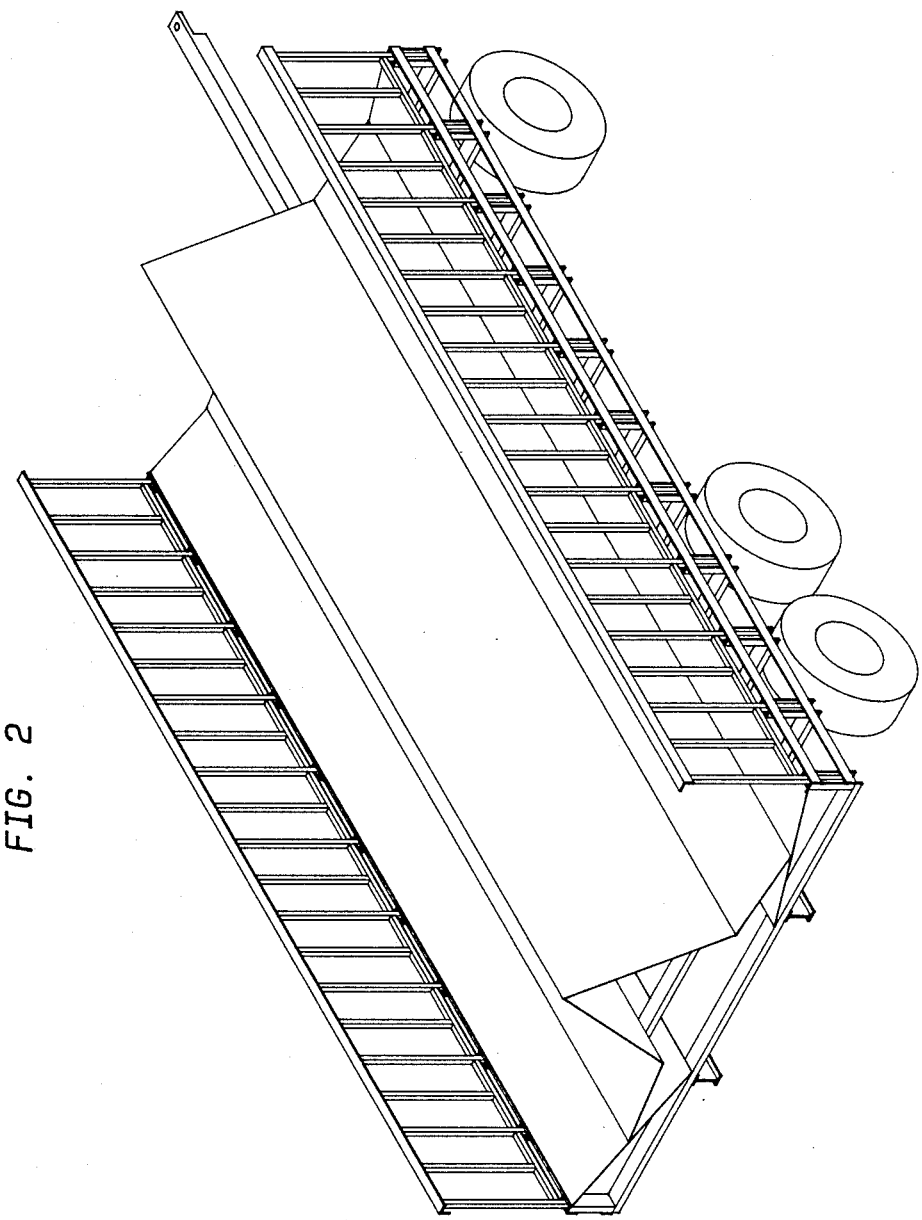

2. FIG. 2 shows the wagon as a livestock feed vehicle with the ladder like structures attached to the side to act as stantions.

3. FIG. 3 is an end view of the wagon with its center superstructure in the lowered position forming two parallel channels.

4. FIG. 4 is the same view as FIG. 3 now showing the center superstructure in a fully raised position.

Figure 5:
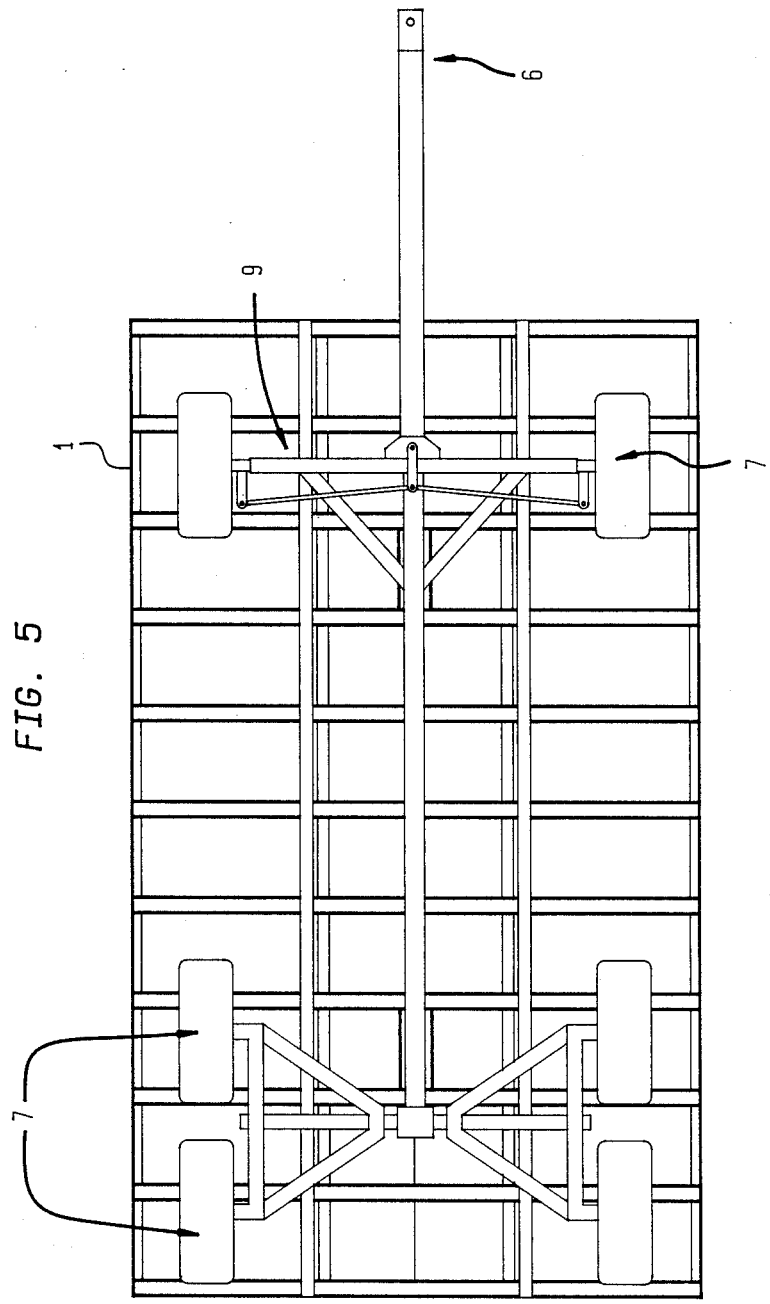

5. FIG. 5 is the bottom view of the wagon frame.

Figure 6:
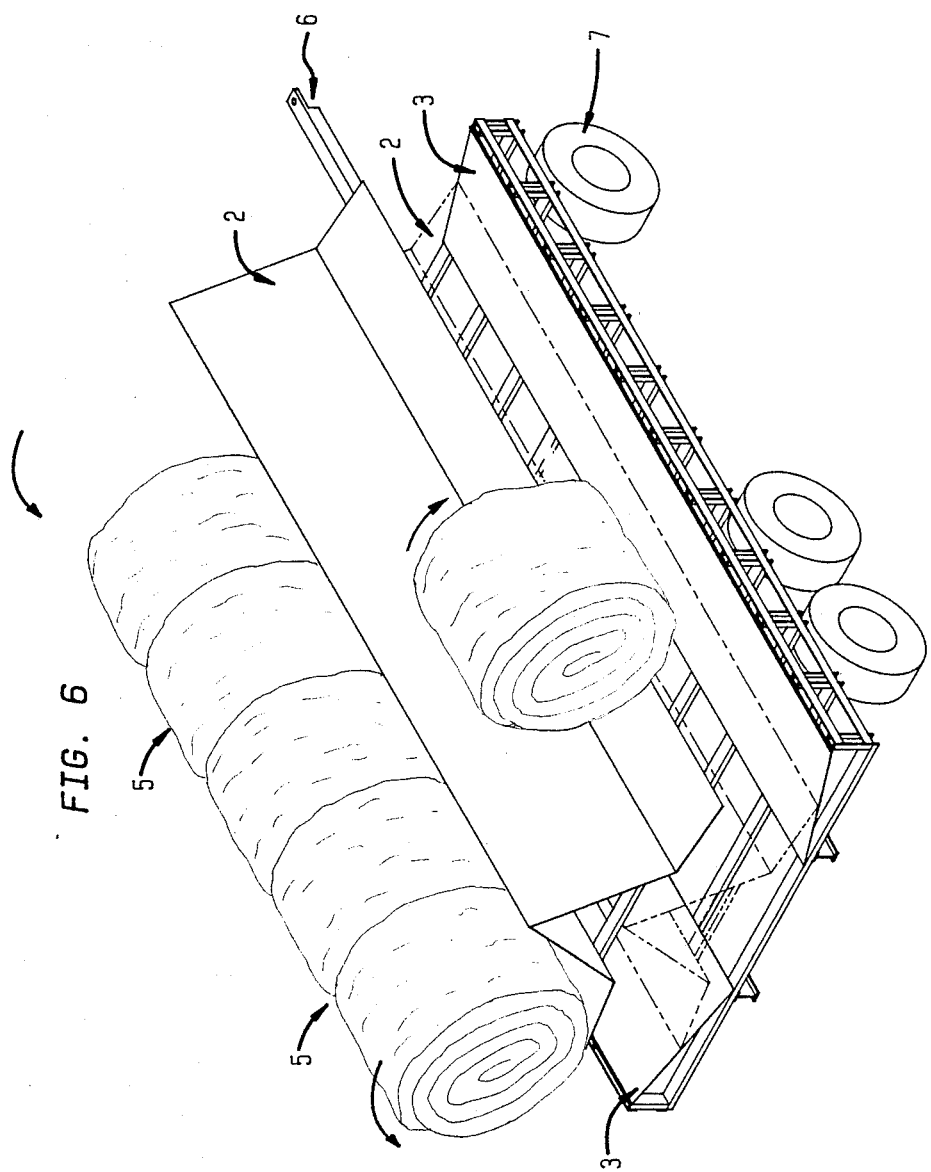

6. FIG. 6 shows the superstructure being raised and the bales falling to the side.

Figure 7A:
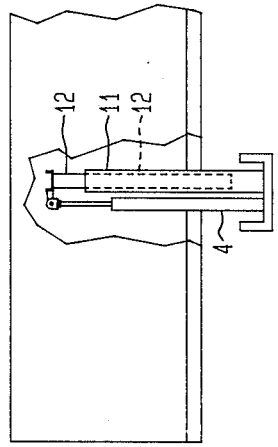
Figure 7B:
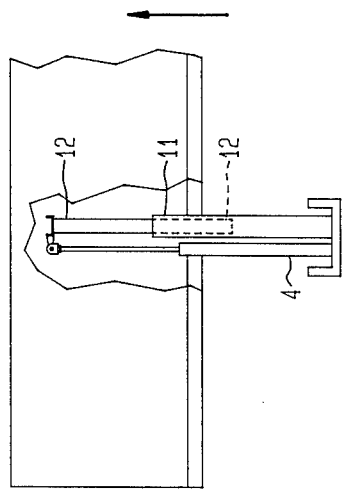

7. FIG. 7A and 7B show the hydraulic cylinder adjacent to two reciprocating hollow pipes of varying diameter one of which fits into the other providing support and guidance; in this embodiment of the invention, the larger diameter pipe is attached to the frame, the smaller diameter pipe is attached to the superstructure.

Figure 8:
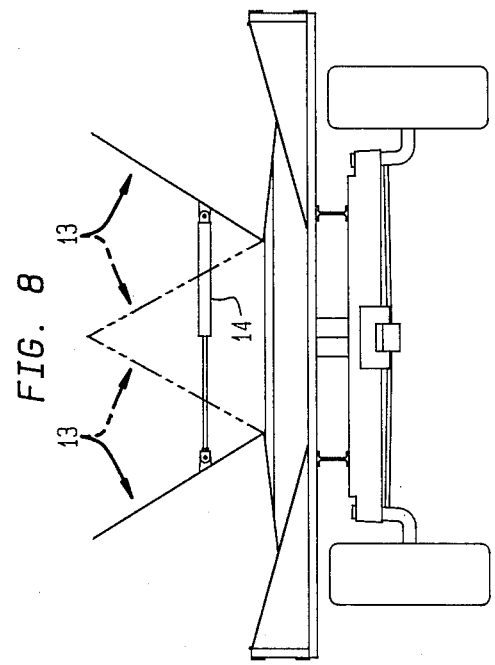

8. FIG. 8 is an alternate configuration of the wagon with the cylinder pivoting out the sides of the superstructure. The cylinders are hinge at their base.

9. FIG. 9A and 9B show another variation of the wagon with one large hydraulic cylinder at the front and with the superstructure hinge to the frame at its rear. In 9A the superstructure is in a lowered position in 9B it is in a raised position.

IV. DESCRIPTION OF THE PREFERRED EMBODIMENT

The preferred embodiment of the invention is set forth in detail in the attached drawings. FIG. 5 shows the components as follows: a wagon frame (1) to which is attached an axle or axles (9) and wheels (7) with a hitch (6) for attachment to a tractor or other means of mobility.

On the top of the wagon frame running along the two outside edges of the wagon and slanting in towards the center are two wedge shaped structures (3), see FIGS. 3 and 4. In the drawings the wedge shaped structures are formed by long, narrow, rectangular plates which are supported and raised on their outside edge so they slant in towards the center of the wagon. The wedge shaped structures could on their top surface be made concave to better conform to the curved surface of a round bale, although this is not absolutely necessary. In the center of the wagon is a superstructure (2) which can be raised or lowered by hydraulic (4) means.

When the superstructure (2) is lowered onto the wagon, two long parallel channels or depressions are formed with the wedge shaped structures (3), on which the round bales (5) can be set in two parallel rows on either side of the superstructure (2), see FIG. 1.

It is anticipated two or more hydraulic cylinders (4) would be used to raise the superstructure (2). One end of each of the hydraulic cylinders would be attached to the superstructure, the other end to the frame of the wagon. The hydraulic cylinders would be the only structural attachment of the superstructure to the wagon. To add support, guidance, and stability to the hydraulic cylinders as they raise the superstructure two reciprocating structures (11) and (12) as demonstrated in FIGS. 7A and 7B can be added. The reciprocating structures (11) and (12) are of different diameters. The larger cylinder is hollow allowing the smaller one to fit inside. The reciprocating structures move at the same time, separately and in opposite directions. One of the structures (12) is attached to the superstructure, the other (11) to the wagon frame. The reciprocating structures, in the preferred embodiment, would be hollow metal cylinders of different diameter configured as illustrated in FIGS. 7A and 7B, one attached to the superstructure, the other to the frame. They would be open at their unattached ends when the superstructure is raised or lowered a portion of the smaller cylinder would always be inside the larger cylinder, even when the superstructure is in a fully raised position, see FIGS. 7A and 7B. One or more pairs of these reciprocating cylinders would be used. In the preferred embodiment a pair would be adjacent to each hydraulic cylinder.

Power for the hydraulic cylinders (4) in the preferred embodiment would be provided through hydraulic lines, running from a tractor or other means of mobility, to the hydraulic cylinders.

The round bale hauler can be loaded in the field by one person, the farmer using a tractor with a fork lift. The bales when they are lying on their curved side would be picked up from one of their flat ends by the fork on the tractor, raised and brought to the rear of the Round Bale Hauler, with the superstructure in a lowered position, and then pushed onto one of the parallel channels on the Round Bale Hauler with the curved surface of the bale resting in one of the parallel channels.

As each successive bale is added to the end of one of the parallel channels of the Round Bale Hauler, the bale or bales which are already on the Round Bale Hauler are pushed forward until each channel is filled with a row of round bales lying on their curved side and aligned flat end to flat end. The tractor or other means of mobility is then attached to the Round Bale Hauler, hydraulic lines are then attached to the tractor or means of mobility.

The entire apparatus with the two parallel rows of round bales can be moved to an appropriate place of storage. The bales are unloaded when the superstructure (2) is raised by the hydraulic means (4), and the bales (5) are ejected off to the side of the wagon see FIG. 6.

An alternate configuration which can accomplish the same result, is set forth in FIG. 8. This configuration has the superstructure permanently attached to the wagon but the upper sides (13) are hinged at their base and are not permanently attached. This allows the top to pivot back and forth. Means for pivoting the sides back and forth on their hinged edge, as indicated in FIG. 8, would be accomplished by attaching a hydraulic cylinder (14) to the inside of each side of the superstructure so the sides can be pivoted back and forth as demonstrated in FIG. 8.

The ends of each hydraulic cylinder 14 attached to the inside of the superstructure would be hinged to allow the free motion of the sides as they are pivoted back and forth.

A third species or configuration is set forth in FIGS. 9A and 9B. In this configuration the rear portion of the superstructure (15) is attached by a hinge to the rear of the wagon or frame.

A hydraulic cylinder (16) of suitable size raises and lowers the superstructure by pivoting it on its hinged end as demonstrated in FIG. 9A and 9B. One end of the hydraulic cylinder is attached to the front end of the superstructure, the other end of the cylinder is attached to the front of the frame of the wagon. Both ends of the hydraulic cylinder would be hinged to allow the free movement of both the hydraulic cylinder and superstructure.

The bale carrier can be modified to act as a feed or fodder wagon by addition of the ladder like sides (10) as shown in FIGS. 1 and 2.

The preceding is the preferred embodiment of this apparatus, however, modifications can be made to it without departing from the basic idea of the invention.

I claim:

1. A round bale hauler and unloader comprising; a wagon frame having a central longitudinal axis; one or more axles secured to the frame; wheels rotatably attached to said one or more axles for support and movement;

an elevatable superstructure located along and parallel to the central longitudinal axis of the wagon frame and extending from the front to the rear of the wagon; and, means for raising the superstructure above the wagon frame and for lowering the superstructure onto a portion of the wagon frame, said portion of the wagon frame comprising wedge shaped structures fixedly attached along both top side edges of the wagon frame sloping inward toward the center of the wagon which form, with the superstructure when it is lowered onto the wedge shaped structures, two parallel side by side channels, wherein the bales can be loaded into each of the two parallel channels with the bale axis parallel to the longitudinal axis of the wagon, and unloaded by raising the superstructure above the wagon frame, thereby causing the bales to roll over the wedge shaped structures and off the sides of the wagon.

2. A round bale unloader and hauler as claimed in claim 1 wherein the means to raise the superstructure is by a hydraulic cylinder which is powered by hydraulic lines connected to a tractor.

3. A round bale hauler and unloader as described in claim 2 wherein the hydraulic cylinder has an adjacent cylindrical reciprocating structure comprising two cylinders of different diameters, the larger of which is hollow so that the smaller can fit inside the larger with the one part of the cylindrical reciprocating structure attached to the superstructure and the other part of the cylindrical reciprocating structure attached to the wagon frame.

4. A round bale hauler and unloader comprising:

a wagon frame having a central longitudinal axis with at least one axle with wheels attached thereto for support and movement;

an elevatable superstructure located along and parallel to the central longitudinal axis of the wagon frame and extending from the front to the rear of the wagon;

means for raising the superstructure above the wagon frame and for lowering the superstructure onto the wagon frame;

wedge shaped structures fixedly attached to the top outside portion of the wagon frame sloping inward toward the center of the wagon frame and forming, with the superstructure when it is lowered onto the wedge shaped structures, two parallel channels wherein the bales can be loaded into each of the two parallel channels with the bale axis parallel to the longitudinal axis of the wagon, and unloaded by raising the superstructure above the wagon frame, thereby causing the bales to roll over the wedge shaped structures and off the sides of the wagon.

5. The round bale hauler as described in claim 4 further comprising reciprocating cylinders adjacent the means for raising and lowering the superstructure.

* * * * *